(12) United States Patent
Zirkl

(10) Patent No.: US 8,074,532 B2
(45) Date of Patent: Dec. 13, 2011

(54) DRIVE ARRANGEMENT FOR A MOTOR VEHICLE, IN PARTICULAR A LOW PLATFORM BUS

(75) Inventor: Otwin Zirkl, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 1097 days.

(21) Appl. No.: 11/659,418

(22) PCT Filed: Jul. 5, 2005

(86) PCT No.: PCT/EP2005/007229
§ 371 (c)(1),
(2), (4) Date: Feb. 7, 2007

(87) PCT Pub. No.: WO2006/015670
PCT Pub. Date: Feb. 16, 2006

(65) Prior Publication Data
US 2008/0314178 A1      Dec. 25, 2008

(30) Foreign Application Priority Data
Aug. 7, 2004   (DE) .......................... 10 2004 038 518

(51) Int. Cl.
*F16H 1/14*   (2006.01)
*F16H 57/02*  (2006.01)
(52) U.S. Cl. ........................................ 74/417; 74/606 R
(58) Field of Classification Search .................. 74/417, 74/606 R; 180/291, 292
See application file for complete search history.

(56) References Cited

U.S. PATENT DOCUMENTS

| | | | | |
|---|---|---|---|---|
| 2,195,509 A | * | 4/1940 | Buckendale | 180/292 |
| 2,238,616 A | * | 4/1941 | Wolf | 180/54.1 |
| 2,267,066 A | * | 12/1941 | Wolf | 192/3.63 |
| 2,317,324 A | * | 4/1943 | Wolf | 180/69.6 |
| 4,301,886 A | * | 11/1981 | Kinoshita et al. | 180/261 |
| 4,553,624 A | * | 11/1985 | Yoshii | 180/255 |
| 6,524,208 B1 | * | 2/2003 | Hollermann et al. | 475/91 |
| 6,810,770 B1 | | 11/2004 | Körner et al. | |

FOREIGN PATENT DOCUMENTS

| | | |
|---|---|---|
| DE | 1 044 485 | 11/1958 |
| DE | 91 02 998 | 8/1991 |
| DE | 42 01 513 A1 | 7/1993 |
| DE | 100 42 475 A1 | 7/2001 |
| JP | 02120132 A * | 5/1990 |

* cited by examiner

*Primary Examiner* — Thomas R Hannon
*Assistant Examiner* — Alan Waits
(74) *Attorney, Agent, or Firm* — Davis & Bujold, P.L.L.C.

(57) ABSTRACT

A drive arrangement for a motor vehicle, in particular for a low-floor bus (31) with a rear axle (33) and having a drive motor (34) positioned transverse to the direction of travel (X) and integrally built-in to a rear section (32) of the low-floor bus. The motor, via the gear train, is connection with a first, motor-sided bevel gear stage (36) and a second, axle-sided bevel gear stage (38) leading to a driving connection with the rear axle. The motor-sided bevel gear stage possesses an input driving bevel gear (36*a*) aligned co-axially to a transversely positioned motor shaft (34*a*), which is in meshed gear engagement (36*a/b*) with an output driving bevel gear (36*b*). The meshed gear engagement is placed behind the motor shaft when seen in the direction of travel (X).

11 Claims, 4 Drawing Sheets

DRIVE ARRANGEMENT FOR A MOTOR VEHICLE, IN PARTICULAR A LOW PLATFORM BUS

This application is a national stage completion of PCT/EP2005/007229 filed Jul. 5, 2005, which claims priority from German Application Serial No. 10 2004 038 518.1 filed Aug. 7, 2004.

FIELD OF THE INVENTION

The invention concerns an arrangement for the drive train of a vehicle, in particular a low-floor bus, made known by DE 100 42 475 A1.

BACKGROUND OF THE INVENTION

DE 100 42 475 A1 discloses a drive train arrangement for a low-floor bus, which bus possesses a rear-mounted driving motor, which is oriented transversely to the direction of travel. This driving motor inputs driving energy to the rear axle by way of an angular bevel gear connection. The rear axle in this connection is generally referred to hereinafter as the "portal axle", which axle has structural characteristics convenient for low-floor bus construction. An angular bevel gear drive unit is employed, which consists essentially of a housed gear combination with a motor sided, input driver bevel gear and a corresponding output bevel gear. The latter is bound to the rear axle by a complementary crown gear attachment. The input drive, motor sided bevel gear is co-axial with the motor shaft, which shaft lies transverse to the direction of travel and engages with the output drive bevel gear, which is placed on an intermediate shaft leading to the rear axle. The meshing engagement of both bevel gears, as seen in the direction of travel, is placed ahead of the transversely situated motor axis, i.e., located between the motor drive shaft and the above portal axle. By way of this positioning, a short intermediate shaft is allowable and hence a space-saving construction is thereby achieved.

A problem then arises, if such a drive arrangement is to be designed for both right- and left-handed driving, respectfully as is found in the United States and England where a door may be located between the portal axle and the motor, which is placed transverse and off-center in the rear. This door may be located on the right side of the bus in a case of left-hand drive construction or, conversely, may be located on the left side, in case of right-hand drive construction. Since the widest possible door opening to the rear must be assured, then the placement of a crown gear for rear axle drive is necessary on an off-center wheel-side. Since the motor for right-hand drive travel must be rotated 180° about its vertical axis and counter to that required for left-hand drive, the same direction of rotation must be retained for this reason; a reversal of the direction of rotation for the rear axle of the bus becomes necessary. It is known that for this purpose, an additional spur gear is installed behind the bevel gear stage, which obviously presents the disadvantage of an increase in constructional height, as well as higher costs and a lowered degree of efficiency.

It is the purpose of the present invention to create a drive arrangement of the type described in the introduction, which brings about a change of rotational direction upon a change of position of the driving motor and to do so without an additional demand for space and without a diminution of efficiency.

SUMMARY OF THE INVENTION

According to the invention, provision is made that the meshing engagement of the first bevel gear, that is, the input drive, motor sided bevel gear and the output driving bevel gear, are placed behind—as seen in the direction of travel—the transversely positioned motor drive shaft. By way of this surprisingly simple measure and contrary to the conventional bevel gear stage, a so-called angular drive is employed, by way of which the meshing engagement, as seen in the travel direction, is placed ahead of the motor drive shaft. In this way, a change of rotation is achieved between the motor drive shaft and the rear axle. There the related intermediate shaft, which is connected with the bevel gear of the motor sided bevel gear set, now has an opposite turning direction of rotation. In such a case, the rear axle continues to be driven in the same direction of rotation in spite of the positionally reversed motor. An advantage of this arrangement is that a noticeable savings of space is created for construction room, due to the now eliminated spur gear stage and an improvement in efficiency is attained along with a reduction of costs. Thus, the advantages of the low-floor bus, having a portal axle and a low threshold, wide passenger entry-way can be obtained, which is applicable for both left- and right-hand travel designs.

In an advantageous embodiment of the invention, the output sided bevel gear of the first bevel gear stage, i.e., the so-called angular gear train is affixed to the end of the intermediate shaft, which shaft runs by the end-side at the motor bevel gear and the lengthening of the motor axis is thereby shortened. Advantageously, the intermediate shaft intersects the lengthened motor drive shaft at an angle, which is less than 90° which in practicality, takes up the same, if not less, space than a conventional angular linkage where the engagement of meshing takes place between the motor drive shaft and the rear axle of the vehicle.

In another advantageous embodiment of the invention, the second bevel gear stage can be placed off-center in the rear axle, that is, in the portal axle of the low-floor bus, so that a wider and lower situated personal entry is made possible.

In another advantageous embodiment of the invention, the angular drive unit with a first bevel gear stage is constructed out of two housing parts, which respectively enclose a bevel gear and are bound together by way of a flanged connection. Thereby the advantage is achieved that a housing part of the angular drive unit, namely, the motor sided housing, and the motor sided bevel gear can be adapted to both left-handed driving and right-handed driving. In this arrangement, principally, the conventional output driving bevel gear, within its own housing, has been substituted. In this way, the advantage of an additional reduction of cost is achieved.

BRIEF DESCRIPTION OF THE DRAWINGS

The invention will now be described, by way of example, with reference to the accompanying drawings in which.

DETAILED DESCRIPTION OF THE INVENTION

Figure 1:
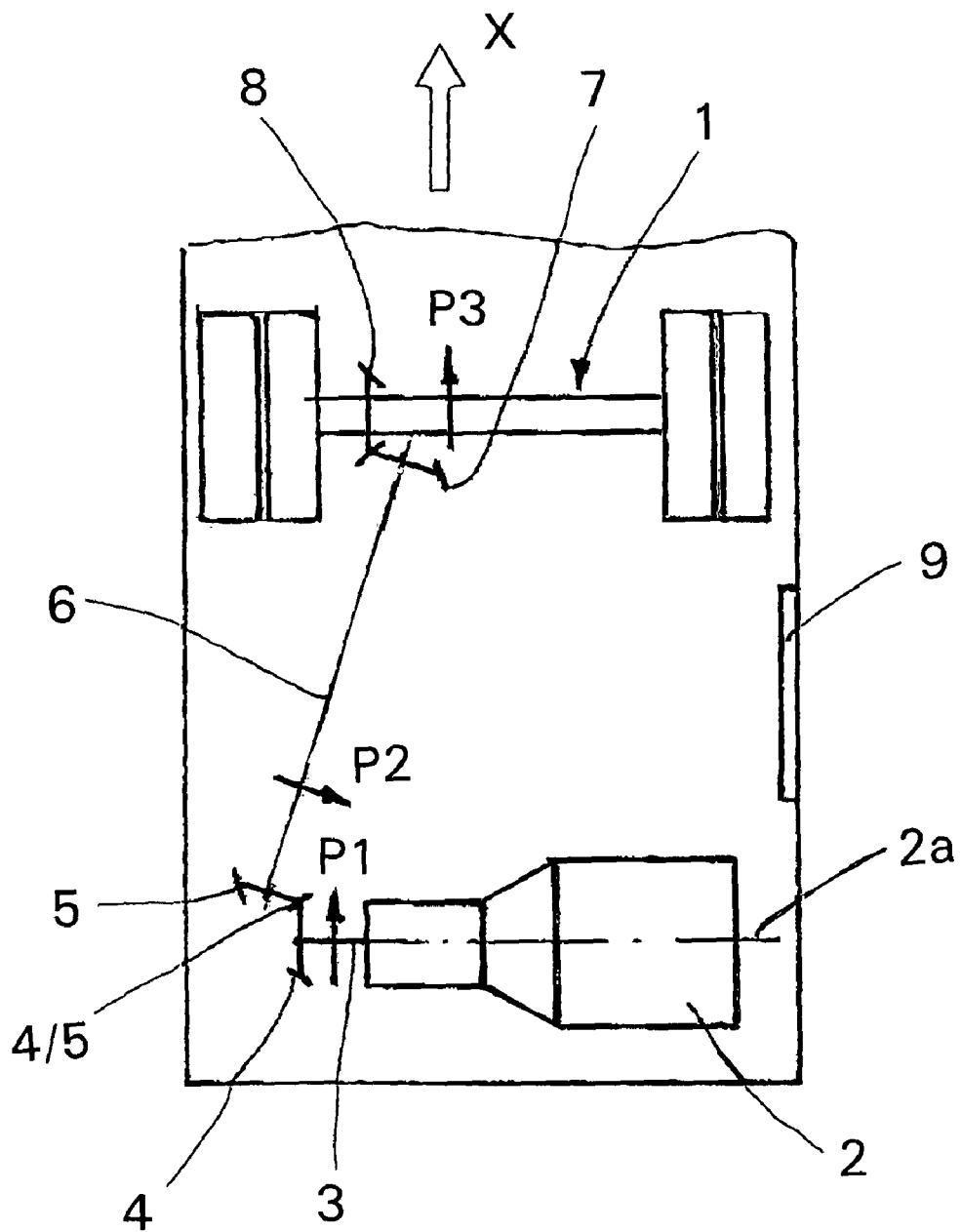
FIG. 1 is a drive arrangement according to the state of technology for left-hand drive.

FIG. 1 illustrates a known arrangement for a left-hand drive, low-floor bus, whereon a rear axle 1 (so-called "portal axle") and a drive motor 2 are shown located in the rear section. In this case, the drive motor 2, as seen in the direction of travel X, is located in a mounting transverse to the direction of travel and placed behind the portal axle 1. The driving motor 2 thus possesses a transversely disposed motor drive shaft 2a and a co-axially positioned output shaft 3, adapted for left-hand drive, onto which a bevel gear 5 with its pinion 4 has been fitted. The direction of rotation of the drive shaft 3 is indicated by an arrow P1. By way of a meshing gear engagement 4/5 of the bevel gear and pinion, which meshing occurs in front of the motor drive shaft 2a, as the pinion bevel gear 4 co-acts with the bevel gear 5 and drives an intermediate shaft 6. The intermediate shaft 6 rotates in the direction shown by arrow P2. By another bevel gear stage, namely a bevel gear pinion 7 mounted on the forward end face of the intermediate shaft 6 and a crown gear 8 affixed about the portal axle 1, the driving mechanism for the rear axle 1 is completed. The direction of rotation of the rear axle 1 is indicated by the arrow P3, which is shown pointing in the direction of travel, namely X. Again, in FIG. 1, a passenger door 9 is to be found on the opposite side from the laterally positioned crown gear 8 or across from the intermediate shaft 6, that is, on the right side of the bus.

Figure 2:
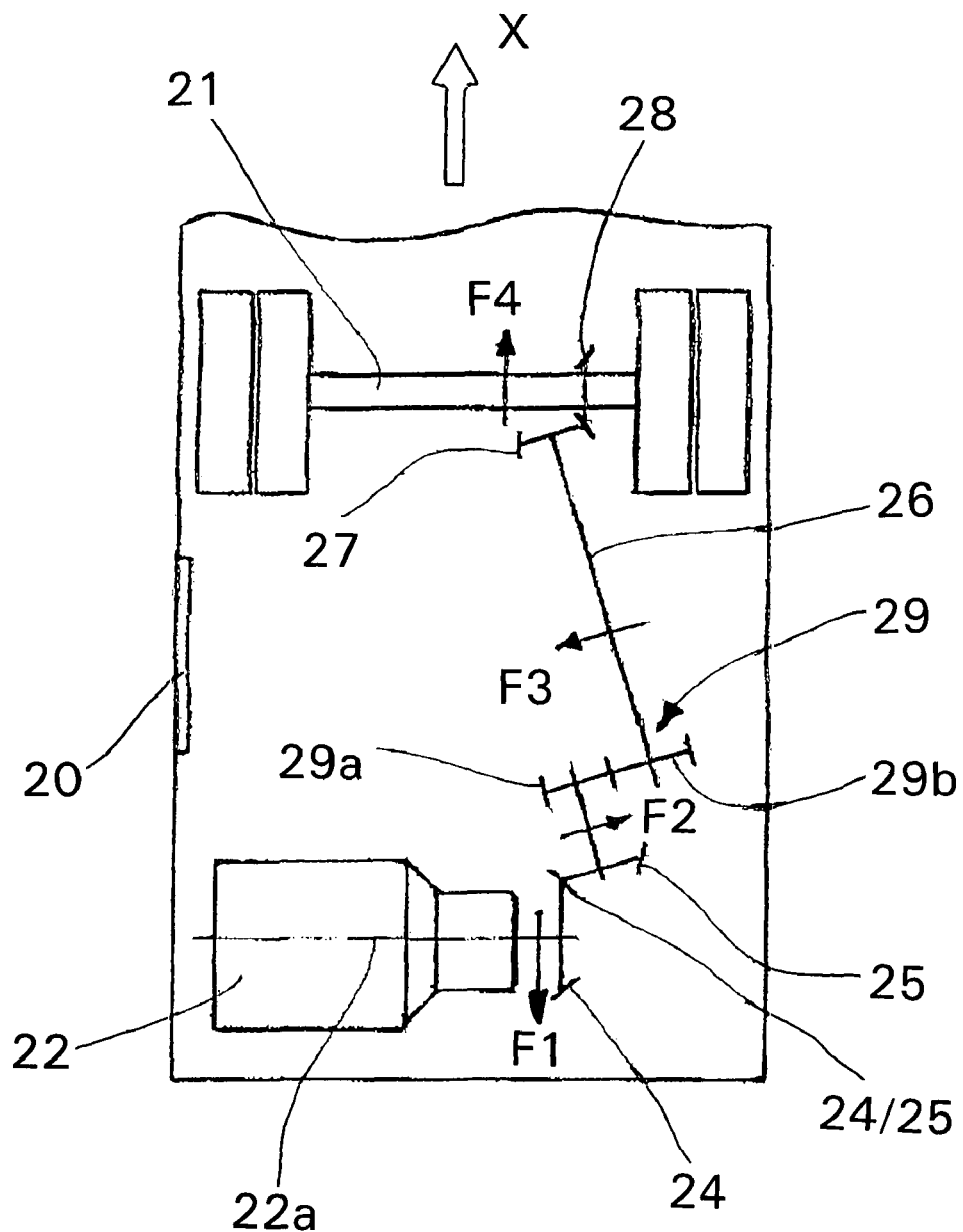
FIG. 2 is a drive arrangement according to state of technology for right-hand drive.

FIG. 2 illustrates another embodiment according to the state of technology, designed for right-hand drive where, once again, only the rear section of the bus with a left-hand oriented passenger door 20 is shown, with a portal axle 21 and a drive motor 22, which motor is to be seen rotated 180° about its vertical axis when compared with FIG. 1 and has a motor drive shaft 22a placed transverse to the direction of travel. The motor 22 has the same direction of rotary motion as the motor 2, as shown in FIG. 1, which is indicated by the arrow F1. An angularly diverted gear arrangement follows the drive motor 22, which arrangement partially consists of mutually engaged bevel gears 24/25. When viewed in the direction of travel X, the meshing engagement of the gears is located forward of the drive shaft 22a. Accordingly, a rotary direction of motion for the output driving bevel gear 25 is indicated by the arrow F2. A spur gear stage 29 is conventionally located between an intermediate shaft 26 and the angular drive 24, 25. The spur gear stage consists of a spur gear pair 29a, 29b, so chosen for a reversal of the direction of rotary movement, so that a direction of rotation for the intermediate shaft 26 becomes indicated by arrow F3. By way of the second bevel gear stage, which consists of the bevel gear pinion 27 and a crown gear 28, the portal axle 21 is driven in the direction of the arrow F4, that is, when vehicle motion is in the marked direction of travel X.

It is obvious from these two representations (FIGS. 1 and 2) of the known drive apparatuses that for the right-hand drive traffic flow situations, a predominately greater assembly cost is necessary and further additional space for installation is required along with increased weight and a diminished operational efficiency.

Figure 3:
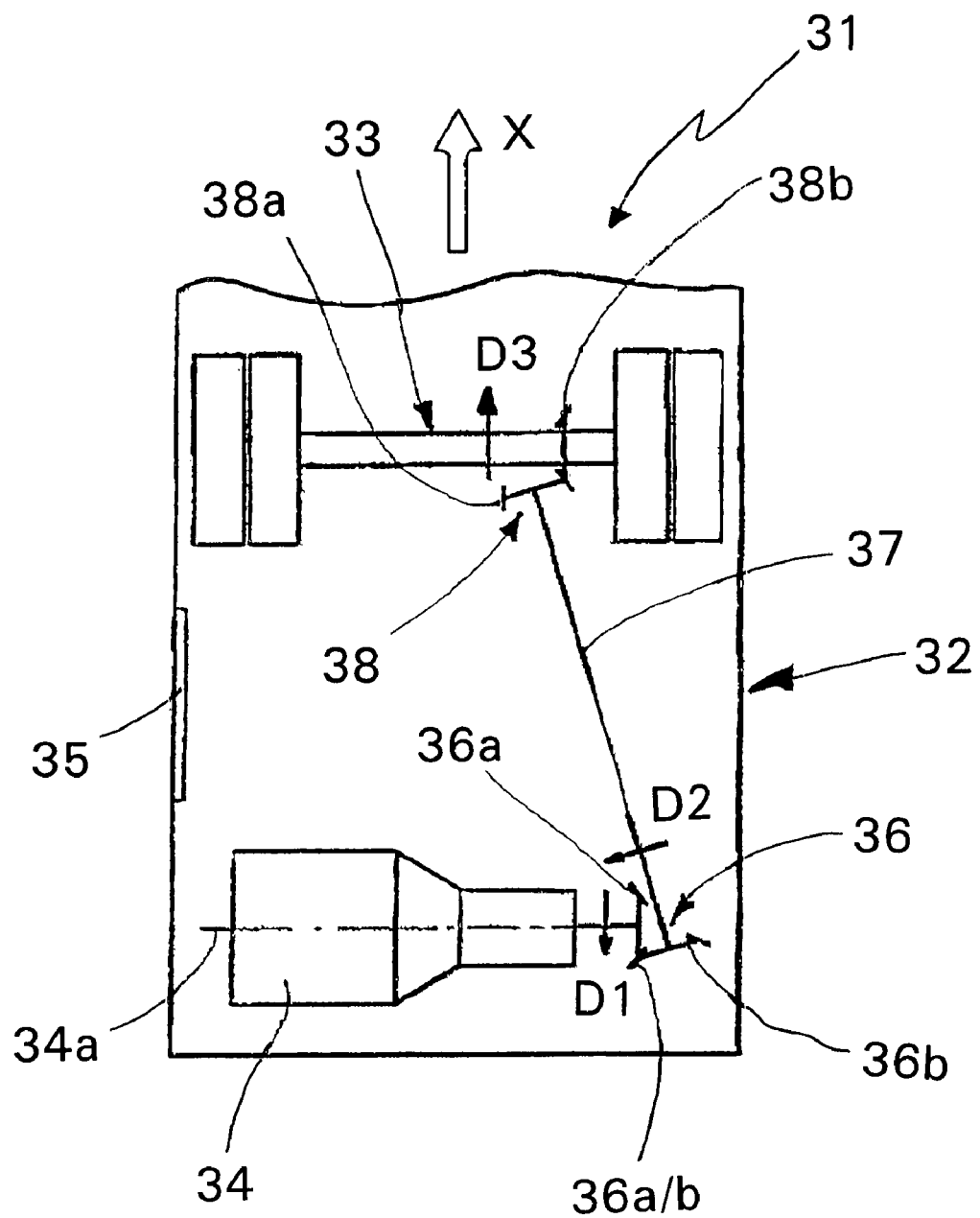
FIG. 3 is an inventive drive arrangement (in schematic form) for right-hand driving.

FIG. 3 shows an inventive drive arrangement for a low-floor bus 31, where only the rear section of the bus is shown. This bus 31 is a right-hand drive bus and can be designed for left-hand drive also. The bus 31 travels forward in direction X. A rear section 32 of the bus is shown with a portal-designed rear axle 33 and a transverse positioned drive motor 34 having a drive shaft 34a. A passenger door 35 for the bus 31 is to be found between the rear axle 33 and the motor 34. The drive motor 34 is connected by way of a drive train consisting of motor-sided first bevel gear stage 36, an intermediate shaft 37 and a second bevel gear stage 38 connected to the rear axle 33, where the direction of rotation of the motor drive shaft 34a is indicated by an arrow D1; the intermediate shaft 37 is shown by arrow D2 and the rear axle 33 indicated by arrow D3. The first bevel gear stage 36 comprises a motor and transmission output shaft 34a, which drives a bevel gear 36a, which meshes with a partner bevel gear 36b. The meshing gear tooth engagement 36a/b between the pair of bevel gears, when seen in the direction of travel X, is located behind the drive shaft 36a of the motor 34. Thereby, the occurrence arises of a left rotation of the motor 34 (see arrow D1) and, accordingly, of a left rotation of the intermediate shaft 37 as seen in arrow D2. The second bevel gear stage 38 consists of a pinion 38a, which is connected to the intermediate shaft 37 and a crown gear 38b which encircles the rear axle 33 somewhat to the right side on the drawing, so that a direction of rotation in accordance with arrow D3 (in the direction of travel) is brought about. An entry door 35 for bus passengers is allowable, by way of this drive arrangement of the angular gearing, which affects the angle drive from bevel gear 36, the intermediate shaft 37 and the second laterally placed bevel gear stage 38 on the rear axle 33. This door 35 is found on the opposite side of the bus, i.e., on the left side. This arrangement makes it possible to have a relatively wider and lower set personal passage in the neighborhood of the rear axle 33, i.e., of the "portal axle".

Figure 4:
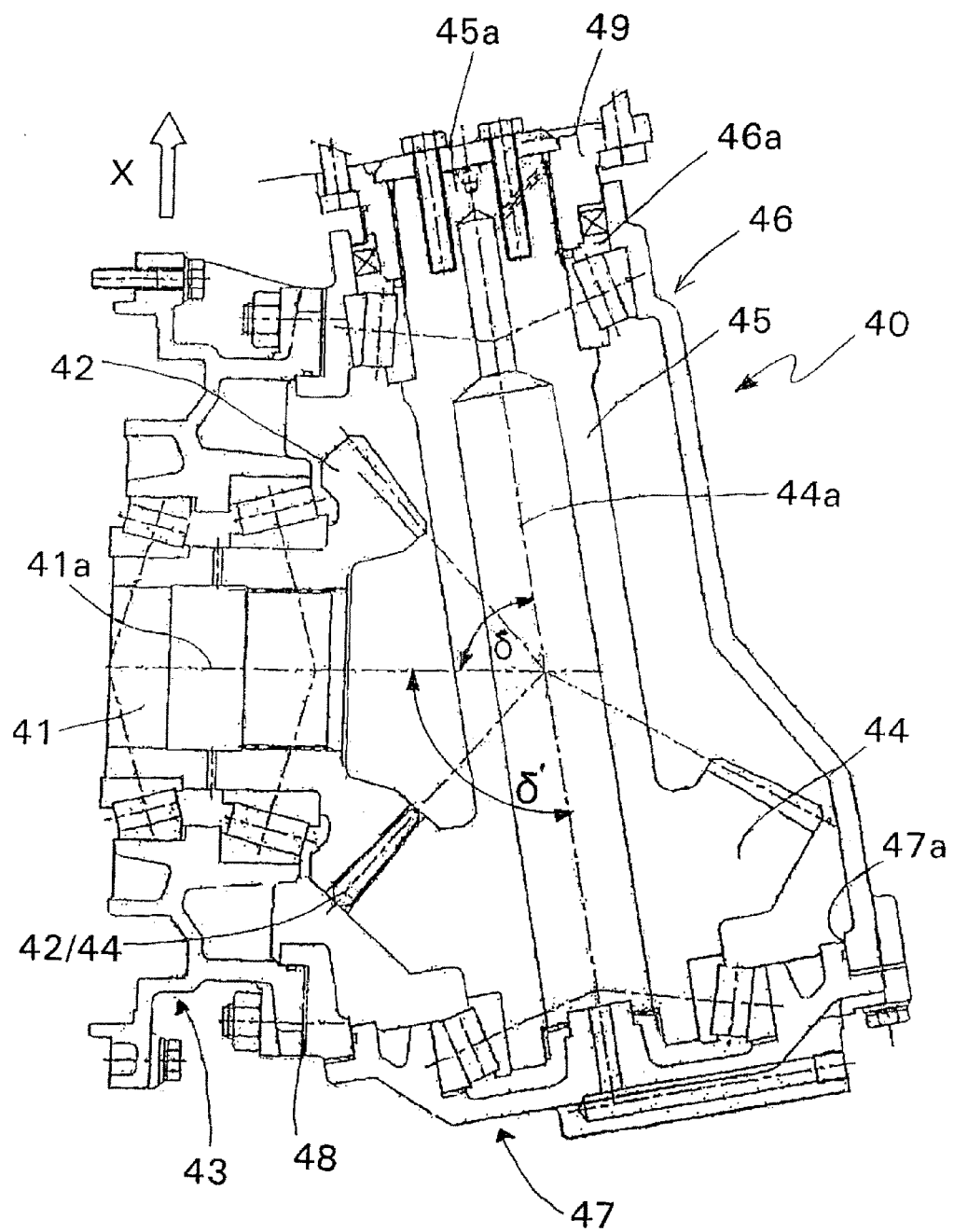
FIG. 4 is an inventive angular drive unit.

FIG. 4 illustrates a designed embodiment of an inventive angular drive unit 40, which represents the motor sided bevel gear stage 36 in FIG. 3. A motor drive shaft, i.e., a transmission sided output shaft 41 is positively connected with a bevel gear pinion 42, which is set into a first housing part of a transmission sided bearing shield 43. The bearing shield 43 is affixed to a transmission (not shown in FIG. 4) which is placed to follow a transversely installed drive motor (not shown). The motor is placed transverse to the longitudinal axis of the bus. The drive shaft 41 possesses an axle 41a, which is placed again transverse to the direction of travel X. A second bevel gear 44 meshes with its appointed pinion 42. The bevel gear 44 possesses an axis of rotation, namely 44a, which forms a second angle δ, which is less than 90° and preferably is approximately 80° or conversely a second angle δ', which is greater than 90° and preferably is approximately 100°. The bevel gear 44 is of a one-piece construction with a hollow extended shaft 45, which is held in co-axial bores 46a, 46b at both ends of the bevel gear shaft remote from the meshing in a second housing part 46. The end of the bevel gear 44 remote from an intermediate shaft 49 is protected by a bearing cover 47. The second housing part 46, by way of a flange connection 48, is joined to the first housing part 43, i.e., actually to the bearing protection cover 47 thereof. The hollow shaft 45 possesses a massive shaft end 45a on that side lying opposite to the bearing protection cover 47 which, in company with a partially shown intermediate shaft 49 (which corresponds to the intermediate shaft 37 in FIG. 3) serves for the purpose of driving the rear axle (which axle is not shown here).

The pair of bevel gears 42, 44 meet in a meshed engagement 42/44 which, when seen in the travel direction X, is to be found behind motor drive shaft 41a. In comparison to an arrangement (not shown) of the output bevel gear having a meshing engagement which, as seen in the direction of travel, is placed in front of the motor drive shaft 41a. The inventive meshing engagement 42/44 causes a reversed direction of rotation for the above hollow shaft 45.

The presented angular drive unit 40, which can advantageously be used for buses for right-hand drive (as per FIG. 3), can also find application for buses with left-hand drives, in a partial capacity, wherein the housing part 46, enclosing the bevel gear 44 and the hollow shaft 45, is exchanged. The bearing shield 43 with the motor sided bevel gear pinion 42 can be employed, conversely, for the left-hand drive type construction, which corresponds to a state of technology embodiment comparable to that of FIG. 1.

| Reference numerals | |
|---|---|
| 1 | rear (often "portal") axle |
| 2 | drive motor |
| 2a | motor axle, i.e., motor drive shaft |
| 3 | drive shaft |
| 4 | pinion for bevel gear 5 |
| 4/5 | tooth engagement |
| 5 | bevel gear |
| 6 | intermediate shaft |
| 7 | bevel gear pinion |
| 8 | crown gear |
| 9 | bus door, for passengers |
| 20 | bus door, for passengers |
| 21 | rear (portal) axle |
| 22 | drive motor |
| 22a | motor axle, i.e., motor drive shaft |
| 24 | bevel gear pinion |
| 24/25 | thread engagement |
| 25 | bevel gear |
| 26 | intermediate shaft |
| 27 | bevel gear pinion |
| 28 | crown gear |
| 29 | spur gear stage (generally, "stage or "pair") |
| 29a | spur gear pinion |
| 29b | spur gear |
| 31 | low-floor bus |
| 32 | rear section (of bus) |
| 33 | rear (portal) axle |
| 34 | drive motor |
| 34a | motor shaft |
| 35 | bus door, for passengers |
| 36 | first bevel gear |
| 36a | bevel gear pinion |
| 36b | bevel gear |
| 36a/b | gear mesh engagement |
| 37 | intermediate shaft |
| 38 | second bevel gear stage |
| 38a | bevel gear pinion |
| 38b | corwn gear |
| 40 | angular drive unit |
| 41 | drive shaft |
| 41a | central axis of drive shaft 41 |
| 42 | bevel gear pinion |
| 43 | first housing part |
| 44 | second bevel gear |
| 42/44 | meshing gear engagement |
| 44a | bevel gear axle, or axis thereof |
| 45 | hollow shaft (bevel gear axle) |
| 45a | end face of hollow shaft |
| 46 | second housing part |
| 46a | housing boring |
| 46b | housing boring |
| 47 | cover for housing (bearing protector) |
| 48 | flange connection |
| 49 | intermediate shaft (partially shown on FIG. 4) |

The invention claimed is:

1. A drive layout for a rear axle (33) of a low floor bus (31) having a travel direction (X), the drive layout comprising:
a rear axle (33) supporting a pair of spaced apart wheels;
a transversely rear-mounted drive motor (34) having a transverse motor rotational axis (34a);
a motor bevel gear stage (36) and an axle bevel gear stage (38) for drivingly connecting the drive motor (34) to the rear axle (33) and facilitate rotation of the rear axle and travel of the bus;
the motor bevel gear stage (36) comprising:
a motor bevel gear (36a) arranged coaxially with a motor drive shaft which defines the transverse motor rotational axis (34a) extending normal to the travel direction (X); and
a first bevel gear (36b) supported adjacent a first end of an intermediate shaft (37) and meshing with the motor bevel gear (36a) such that the meshing (36a/b) of the motor bevel gear (36a) with the first bevel gear (36b) being located, with respect to the driving direction (X), behind and rearwardly of the transverse motor rotational axis (34a); and
the axle bevel gear stage (38) comprising:
a crown gear (38b) arranged on the rear axle (33);
a second bevel gear (38a) supported adjacent a second end of the intermediate shaft (37) and meshing with the crown gear (38b); and
a first angle ($\delta'$) formed between the first end of the intermediate shaft (37), supporting the first bevel gear (36b), and the motor drive shaft (41) of the drive motor (34) is greater than 90°, while a second angle ($\delta$) formed between the second end of the intermediate shaft (37), supporting the second bevel gear (38a), and the drive shaft (41) of the transversely rear-mounted drive motor (34) is less than 90° and the first and the second angles are supplemental angles,
wherein the motor bevel gear stage (42, 44) forms an angular drive unit (40) which has a first housing part (43) which supports the motor bevel gear (42) and a second housing part (46) which supports the first bevel gear (44, 45), and
wherein the second housing part (46) has two coaxially arranged bores (46a, 46b) and a larger one (46b) of the two coaxially arranged bores (46a, 46b) located rearward of the motor drive shaft is closed by a cover.

2. The drive layout according to claim 1, wherein the first bevel gear (36b, 44) is mounted on the intermediate shaft (37, 45, 49) and an extension of the transverse motor rotational axis (34a, 41a), extending beyond the motor bevel gear (36a, 42), intersects with the intermediate shaft (37, 45, 49).

3. The drive layout according to claim 2, wherein the motor bevel gear stage (42, 44) forms an angular drive unit (40) which has a first housing part (43) which supports the motor bevel gear (42) and a second housing part (46) which supports the first bevel gear (44, 45).

4. The drive layout according to claim 3, wherein the second housing part (46) with the first bevel gear (44, 45) is flanged to the first housing part (43) by a coupling (48).

5. The drive layout according to claim 1, wherein the second housing part (46) with the first bevel gear (44, 45) is flanged to the first housing part (43) by a coupling (48).

6. The drive layout according to claim 1, wherein the first angle ($\delta'$) formed between the first end of the intermediate shaft (37), supporting the first bevel gear (36b), and the drive shaft (41) of the transversely rear-mounted drive motor (34) is approximately 100°, while the second angle ($\delta$) formed between the second end of the intermediate shaft (37), supporting the second bevel gear (38a), and the drive shaft (41) of the transversely rear-mounted drive motor (34) is approximately 80°.

7. A rear axle bus drive layout for a rear axle (33) of a low floor bus (31) having a travel direction (X), the drive layout comprising:
a rear axle (33) supporting a pair of spaced apart wheels;
a transversely rear-mounted drive motor (34) having a transverse motor rotational axis (34a);
a motor bevel gear stage (36) and an axle bevel gear stage (38) for drivingly connecting the drive motor (34) to the rear axle (33) and facilitate rotation of the rear axle and travel;
the motor bevel gear stage (36) comprising:
a motor bevel gear (36a) arranged coaxially with a motor drive shaft which defines the transverse motor rotational axis (34a) extending normal to the travel direction (X); and a first bevel gear (36b) being supported adjacent a first end of an intermediate shaft (37) and meshing with the motor bevel gear (36a) such that the meshing (36 a/b) of the motor bevel gear (36a) with the first bevel gear (36b) being located, with respect to the driving direction (X), behind the transverse motor rotational axis (34a) such that the transverse motor rotational axis (34a) is located between the rear axle (33) and the meshing (36 a/b) of the motor bevel gear (36a) with the first bevel gear (36b); and an extension of the transverse motor rotational axis (34a, 41a) that extends beyond the motor bevel gear (36a, 42), intersects the intermediate shaft (37, 45, 49) at a point along the intermediate shaft (37, 45, 49) which with respect to the travel direction (X) delimits front and rear axial portions of the intermediate shaft (37, 45.49), the rear portion of the intermediate shaft (37, 45, 49) being at a first angle (δ') with the motor drive shaft that is greater than 90°, the front portion of the intermediate shaft (37, 45, 49) being at a second angle (δ) with the motor drive shaft that is less than 90°, and the first and the second angles are supplemental angles;

the axle bevel gear stage (38) comprising:
  a crown gear (38b) arranged laterally on the rear axle (33); and
  a second bevel gear (38a) supported adjacent a second end of the intermediate shaft (37) and meshing with the crown gear (38b) to facilitate rotation of the rear axle, wherein the motor bevel gear stage (42, 44) forms an angular drive unit (40) which has a first housing part (43) which supports the motor bevel gear (42) and a second housing part (46) which supports the first bevel gear (44, 45), and wherein the second housing part (46) has two coaxially arranged bores (46a, 46b) and a larger one (46b) of the two coaxially arranged bores (46a, 46b) located rearward of the motor drive shaft is closed by a cover.

8. A rear axle bus drive layout for a rear axle (33) of a low floor bus (31) having a bus travel direction (X), the drive layout comprising:
  the rear axle (33) supporting a pair of spaced apart wheels and defining a rear axle rotational axis;
  a drive motor (34) being located, with respect to the bus travel direction (X), behind the rear axle (33), the drive motor (34) defining a motor rotational axis (34a, 41a) and having a drive shaft (41), the motor rotational axis (34a, 41a) and the drive shaft (41) being coaxial and aligned substantially normal to the bus travel direction (X);
  a motor bevel gear stage (40), an intermediate shaft (37, 45, 49) and an axle bevel gear stage (38) for transmitting drive from the drive motor (34) to the rear axle (33) to facilitate rotation of the rear axle (33) and travel of the bus (31);
  the motor bevel gear stage (36) comprising:
    a motor bevel gear (42) that is arranged coaxially with and rotationally driven by the drive shaft (41) about the motor rotational axis (34a, 41a); and
    a first bevel gear (44) that is arranged coaxially with and supported at an end of the intermediate shaft (37) to rotate about an intermediate shaft rotational axis (44a), the first bevel gear (44) engaging the motor bevel gear (42) at a meshing engagement point (42/44),
  the motor rotational axis (34a, 41a) being aligned with the intermediate shaft (37, 45, 49) such that a continuance of the motor rotational axis (34a, 41a) that extends beyond the motor bevel gear (42) intersects the intermediate shaft (37) and bisects the intermediate shaft rotational axis (44a), at an intersection point, into a front portion and a rear portion, such that, with respect to the bus travel direction (X), the front portion of the intermediate shaft rotational axis (44a) extends forward from the intersection point to the axle bevel gear stage (38), and the rear portion of the intermediate shaft rotational axis (44a) extends rearward from the intersection point to the first bevel gear (44);
  the intermediate shaft (37, 45, 49) extends rearward, with respect to the bus travel direction (X), from the intersection point such that the meshing engagement point (42/44) is located, with respect to the driving direction (X), behind the motor rotational axis (34a, 41a); and
  the intermediate shaft (37, 45, 49) is arranged with respect to the motor rotational axis (34a, 41a) such that a first angle (δ') of greater than 90° is formed between the rear portion of the intermediate shaft rotational axis (44a) and the motor rotational axis (34a, 41a), extending between the intersection point and the drive motor (34) and a second angle (δ) of less than 90° is formed between the front portion of the intermediate shaft rotational axis (44a) and the motor rotational axis (34a, 41a), extending between the intersection point and the drive motor (34), and the first and the second angles are supplemental angles,
  wherein the first angle (δ') formed between the rear portion of the intermediate shaft rotational axis (44a) and the motor rotational axis (34a, 41a), located between the intersection point and the drive motor, is approximately 100°.

9. The drive layout according to claim 8, wherein the second angle (δ) formed between the front portion of the intermediate shaft rotational axis (44a) and the motor rotational axis (34a, 41a), located between the intersection point and the drive motor (34), is approximately 80°.

10. The drive layout according to claim 8, wherein the low floor bus (31) comprises a door (35) that is located, with respect to the bus travel direction (X), on a left hand side of the bus (31) behind the rear axle (33).

11. The drive layout according to claim 8, wherein the axle bevel gear stage (38) comprises a crown gear (38b) that is arranged laterally on the rear axle (33) between the pair of spaced apart wheels; and a second bevel gear (38a) is supported adjacent a second end of the intermediate shaft (37) and meshes with the crown gear (38b), and a meshing engagement (38 a/b) of the second bevel gear (38a) with the crown gear (38b) is located, with respect to the driving direction (X), behind the rear axle rotational axis such that the meshing engagement (38 a/b) of the second bevel gear (38a) with the crown gear (38b) is located between the rear axle rotational axis and the transverse motor rotational axis (34a).

* * * * *